United States Patent [19]
Lefebvre

[11] Patent Number: 5,675,514
[45] Date of Patent: Oct. 7, 1997

[54] TELEMETRIC SPACIAL DATA RECORDER

[76] Inventor: Guy Lefebvre, 8605 Galeries d'Anjou #7, Ville d'Anjou, Québec, Canada, H1J 1X1

[21] Appl. No.: 630,129

[22] Filed: Apr. 10, 1996

[51] Int. Cl.$^6$ .............................. G01C 5/00; G06F 15/00
[52] U.S. Cl. .................. 364/559; 364/560; 364/561; 356/376
[58] Field of Search ....................... 364/559, 560, 364/550, 561–562, 474.37, 565, 564; 33/503, 700, 755; 356/372, 375, 376, 383, 385, 373

[56] References Cited

U.S. PATENT DOCUMENTS

| | | | |
|---|---|---|---|
| 4,205,385 | 5/1980 | Erickson et al. | 364/560 |
| 4,688,184 | 8/1987 | Taniguti et al. | 364/560 |
| 4,703,443 | 10/1987 | Moriyasu | 364/559 |
| 4,811,243 | 3/1989 | Racine | 364/560 |
| 4,820,041 | 4/1989 | Davidson et al. | |
| 4,901,253 | 2/1990 | Iwano et al. | 364/550 |
| 5,091,869 | 2/1992 | Ingram et al. | 364/560 |
| 5,148,377 | 9/1992 | McDonald | 364/560 |
| 5,220,536 | 6/1993 | Stringer et al. | 364/565 |
| 5,247,487 | 9/1993 | Beliveau et al. | 364/474.24 |
| 5,256,908 | 10/1993 | Averbuch et al. | 364/564 |
| 5,337,149 | 8/1994 | Kozah et al. | 356/376 |
| 5,422,861 | 6/1995 | Stringer et al. | 364/564 |
| 5,434,803 | 7/1995 | Yoshida | 364/560 |
| 5,440,492 | 8/1995 | Kozah et al. | 364/559 |
| 5,467,290 | 11/1995 | Darland et al. | 364/561 |

Primary Examiner—Emanuel T. Voeltz
Assistant Examiner—Bryan Bui
Attorney, Agent, or Firm—Goudreau Gage Dubuc & Martineau Walker

[57] ABSTRACT

A telemetric spacial data recorder for devising a floor plan is disclosed herein. The telemetric spacial data recorder includes a base member and a remote member mounted to the base member through an extendable cable which is rotatably mounted to said base member. The remote member has a probe. The length of the extendable cable and the angle of the extendable cable with respect to a predetermined reference are measured and supplied to a data collector which computes the spacial coordinates of the probe. Optionally, the probe may include a rotatable boom.

29 Claims, 8 Drawing Sheets

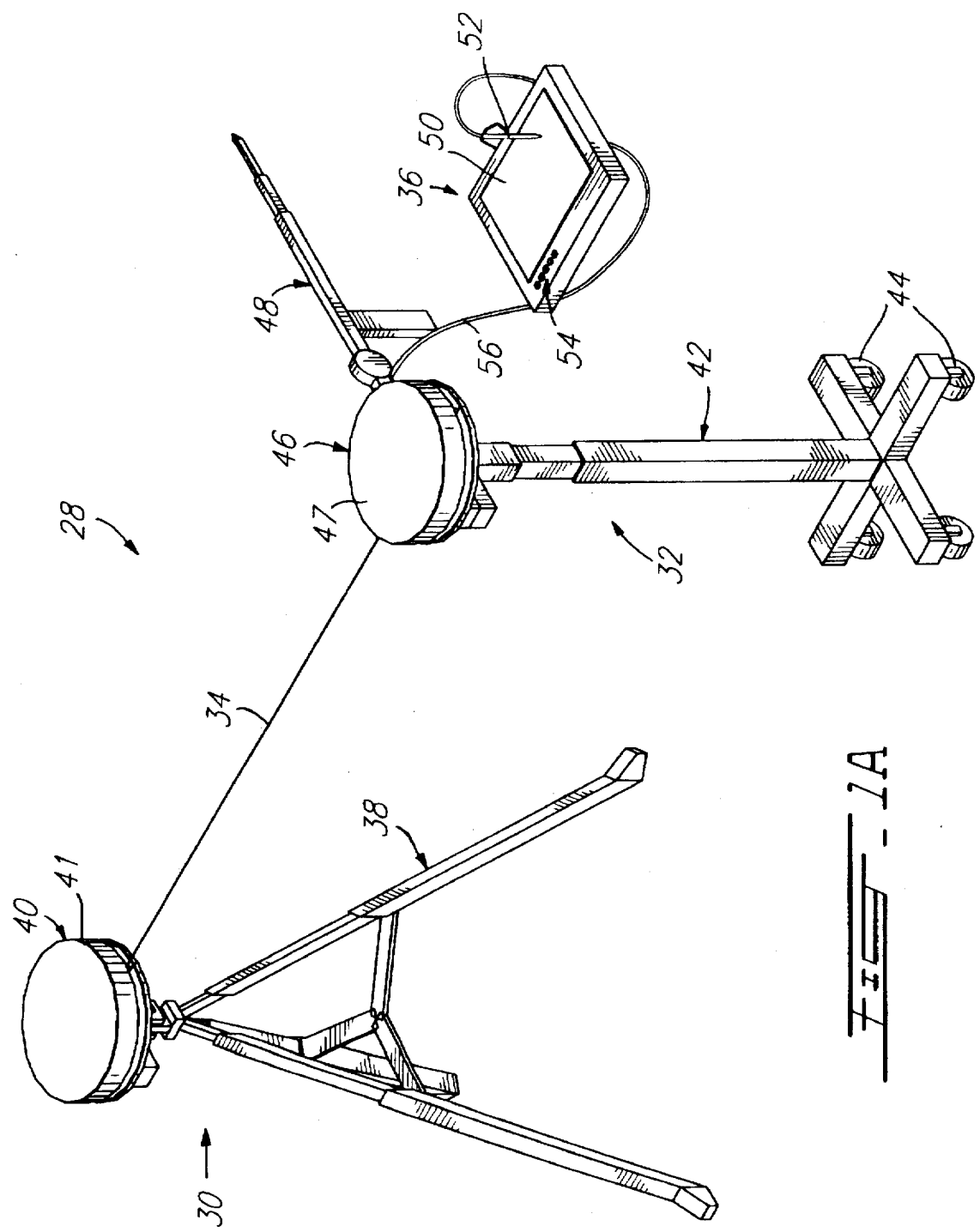

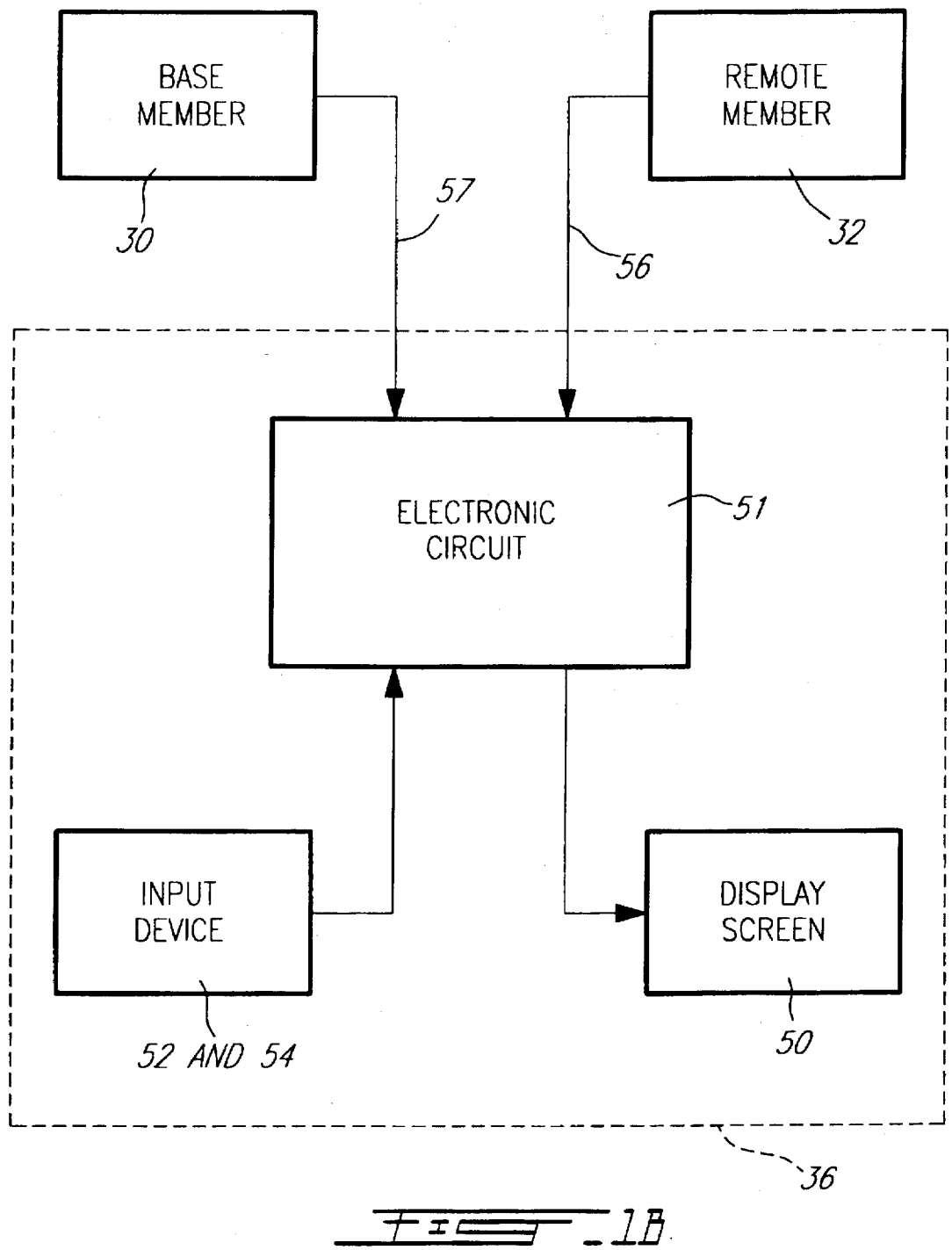

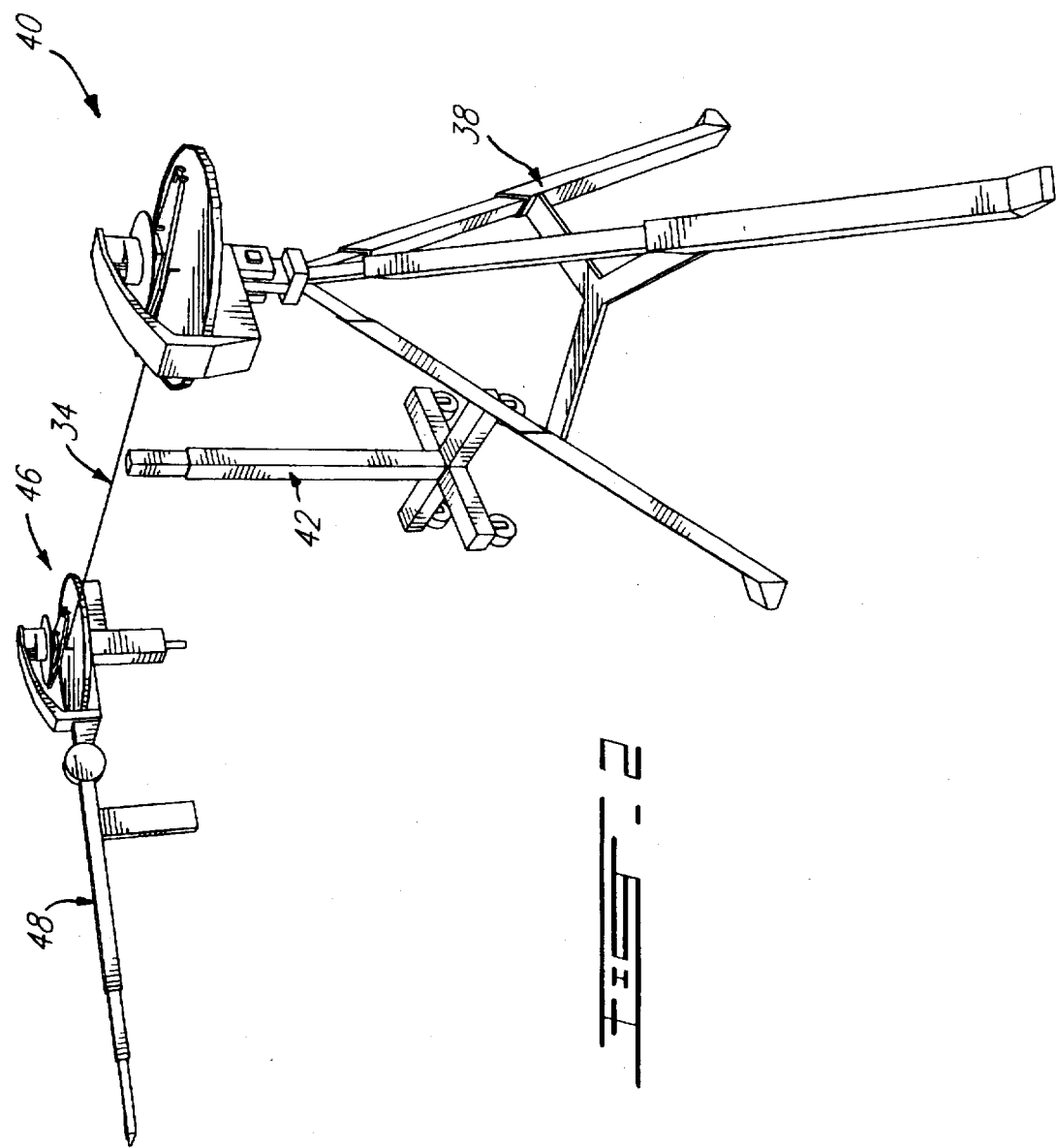

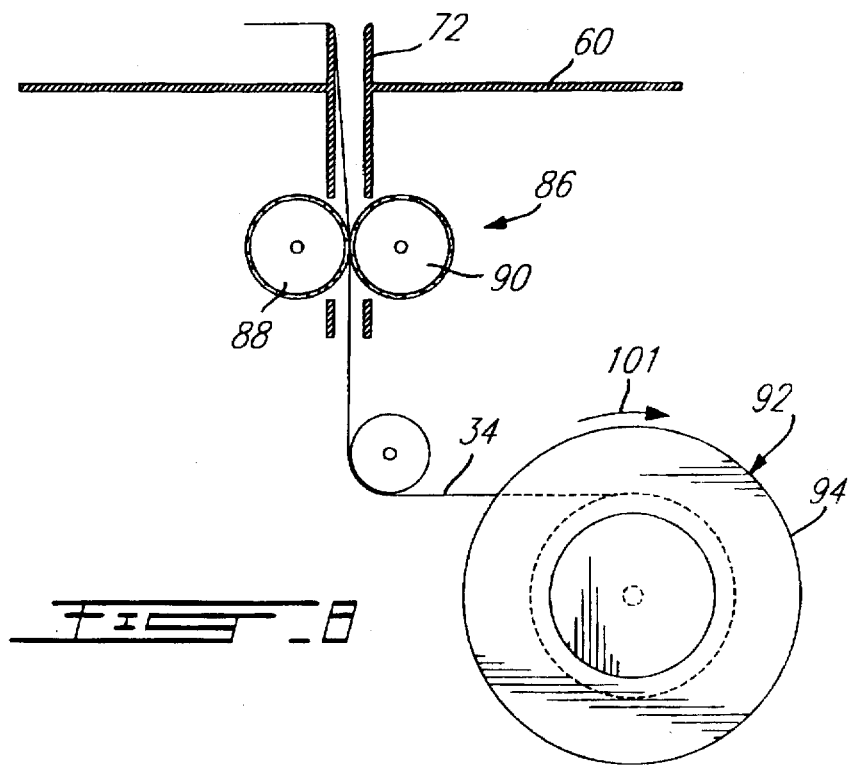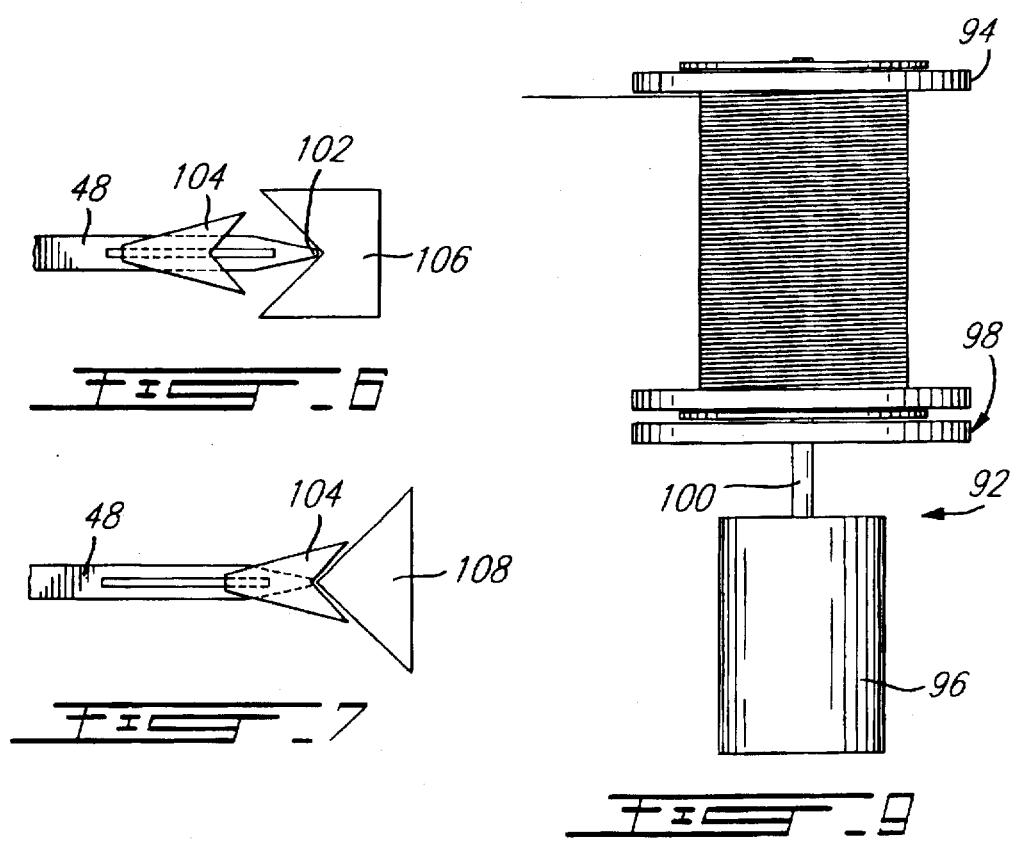

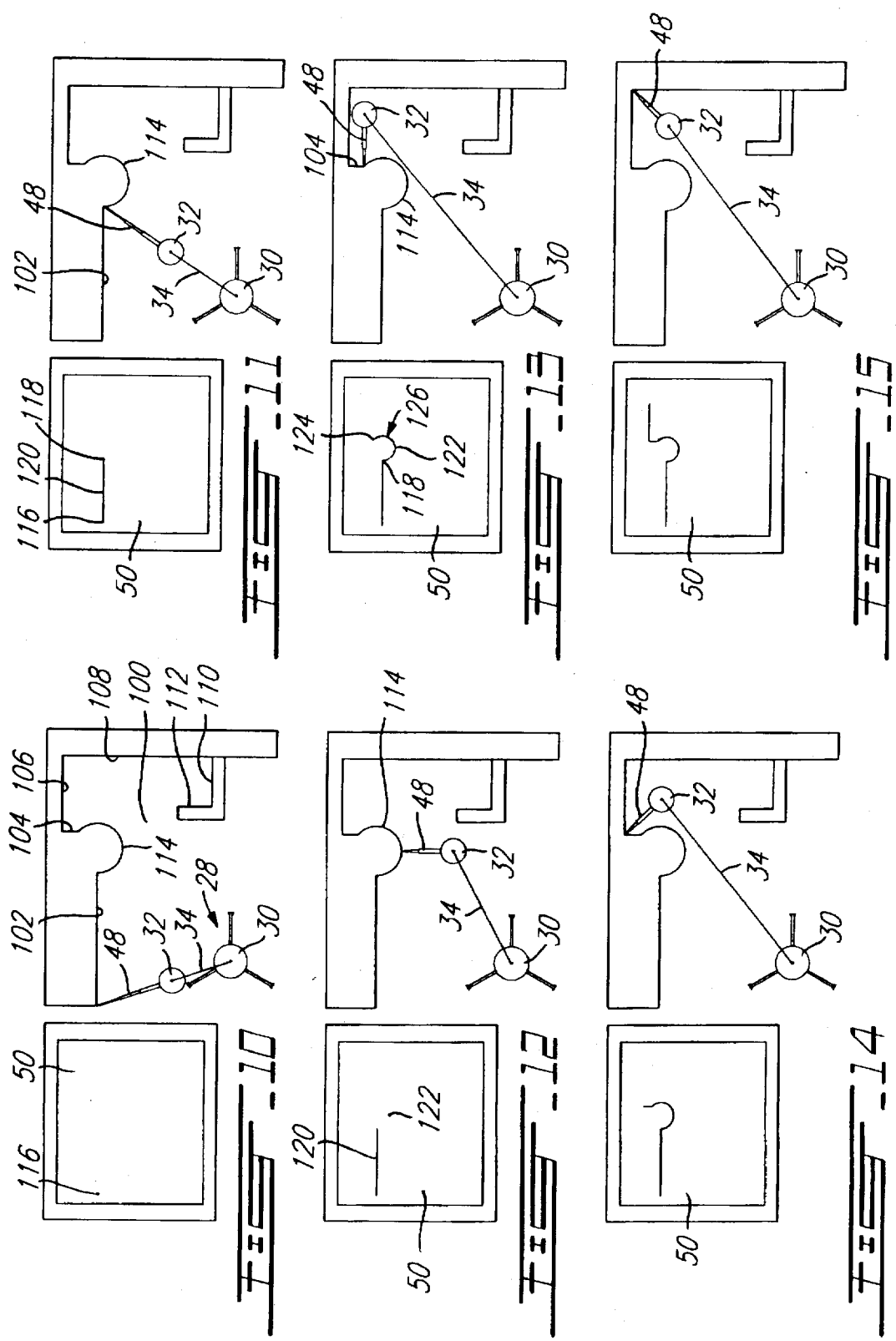

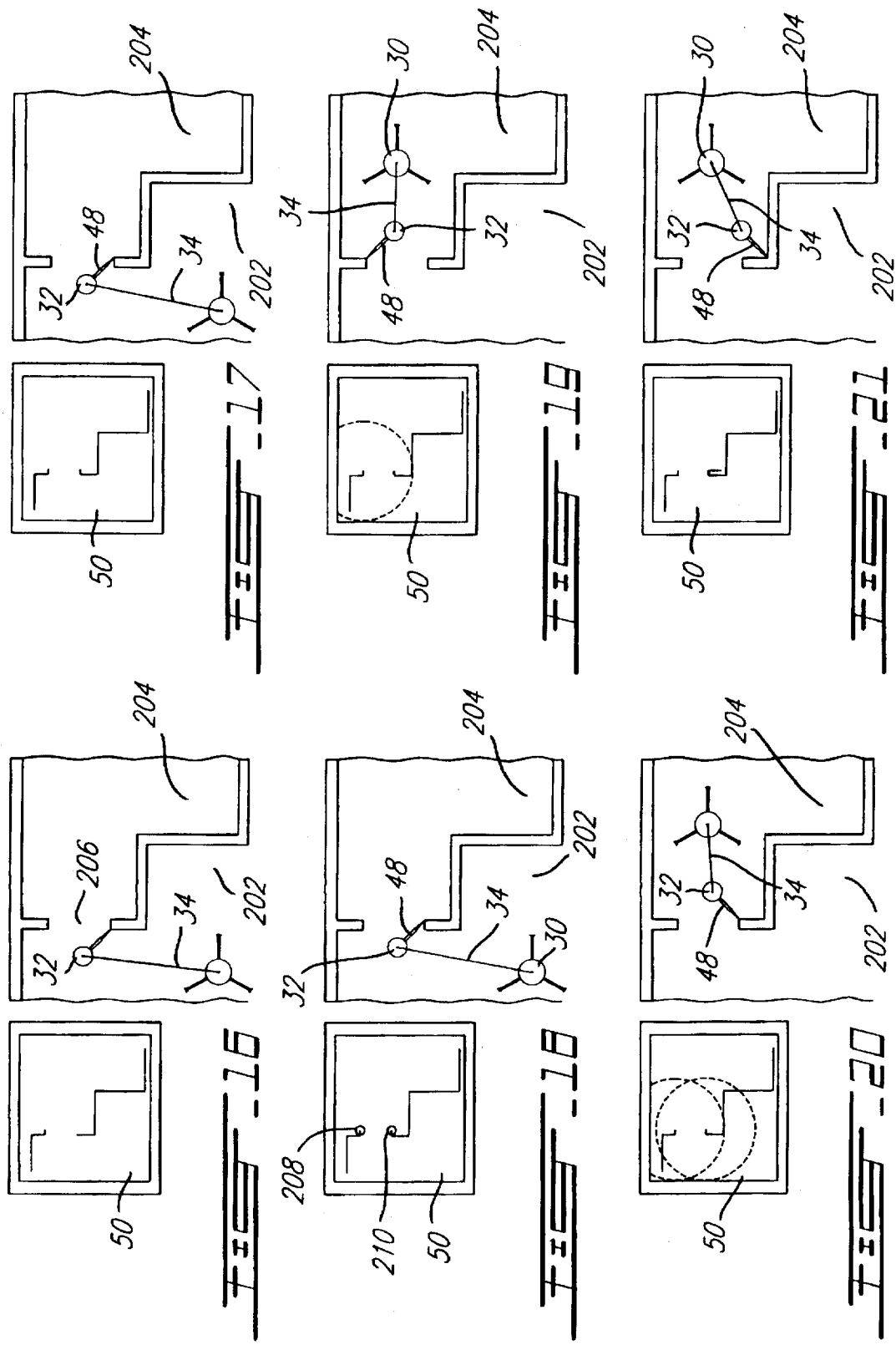

TELEMETRIC SPACIAL DATA RECORDER

FIELD OF THE INVENTION

The present invention relates to a data recorder. More specifically, the present invention relates to a telemetric spacial data recorder which enables the elaboration of a floor plan or the like.

BACKGROUND OF THE INVENTION

The representation of the spacial relationship between coordinate points of objects has been traditionally hand-drawn and displayed on paper plans. The data collected for the elaboration of these plans were generally based on tape and/or optical measurements.

Unfortunately, in a number of cases, tape measurements do not provide the desired or required accuracy. Furthermore, the time required to make a plan from tape measurement is, in many cases, prohibitively long. Elaborate optical methods have thus been devised to increase the precision of the measurements and hence permit the obtention of a more accurate plan.

With the advent of the computer age, it has been found desirable to automatically record the measurements directly onto a data recording device and eventually to transfer these data to a computer so as to enable the production of a computerized plan. One such elaborate and complex device is described in U.S. Pat. No. 5,091,869, issued on Feb. 25, 1992 to Ingram et al. Ingram teaches a method for devising a floor plan comprising the selection of traverse points, the setting up of a surveying instrument on the traverse point and measuring distances and angles to prominent points of the floor. A further traverse point is then selected and the process repeated until all the data are collected. The data may then be transferred to a computer and converted into a floor plan. The gathering of the data, according to Ingram et al., is a fastidious and complex operation which requires at least a two person team. In addition, the data collection necessitates the use of optical devices such as an EDM (Electronic Distance Measurement) device and a theodolite.

U.S. Pat. No. 5,091,869 also discloses a probe attachable to a beam reflecting prism and protruding therefrom, the prism being employed to optically measure the distance between the traverse point and the prominent point. The probe enables the recording of a distance in a restricted area where the prism itself cannot be received.

It would thus be an advantage to provide a telemetric spacial data recorder simple to operate that overcomes the drawbacks of the prior art. For example, it would be advantageous to provide a telemetric spacial data recorder that may be operated by a single operator and that enables the operator to devise a floor plan in a relatively short time.

OBJECTS OF THE INVENTION

An object of the present invention is therefore to provide an improved telemetric spacial data recorder which overcomes the above discussed drawbacks of conventional and optically based data recording devices.

Another object of the present invention is to provide a telemetric spacial data recorder which enables a single user to measure the spacial coordinates of objects.

SUMMARY OF THE INVENTION

More specifically, in accordance with the present invention, there is provided a telemetric spacial data recorder for devising a floor plan comprising:

a base member;

a remote member having a probe;

extendable cable means connecting the remote member to the base member, the extendable cable means being mounted to the base member so as to rotate about a rotation axis substantially perpendicular to the floor; the extendable cable having a variable length;

a cable angle measuring assembly mounted to the base member to measure an angular position of the extendable cable means with respect to a predetermined reference point;

a cable length measuring assembly mounted to one of the base member and the remote member for measuring the length of the extendable cable means; and data acquisition means electrically connected to the cable angle measuring assembly and to the cable length measuring assembly, the data acquisition means collecting cable angular position data from the cable angle measuring assembly and cable length data from the cable length measuring assembly, whereby, when the probe is brought in contact with a point of a physical object, angle data and length data are respectively supplied to the data acquisition means by the cable angle measuring assembly and cable length measuring assembly, the angle data and the length data permitting a determination of relative spacial coordinates of the point of the physical object with respect to the base member.

According to a preferred embodiment of the present invention, there is provided a telemetric spacial data recorder for devising a floor plan comprising:

a base member;

a remote member having a probe;

extendable cable means connecting the remote member to the base member, the extendable cable means being mounted to the base member so as to rotate about a first rotation axis substantially perpendicular to the floor; the extendable cable means being mounted to the remote member so as to rotate about a second rotation axis substantially perpendicular to the floor; the extendable cable having a variable length;

a first cable angle measuring assembly mounted to the base member to measure a first angular position of the extendable cable means with respect to a first predetermined reference point;

a second cable angle measuring assembly mounted to the remote member to measure a second angular position of the extendable cable means with respect to a second predetermined reference point;

a cable length measuring assembly mounted to one of the base member and the remote member for measuring the length of the extendable cable means; and data acquisition means electrically connected to the first and second cable angle measuring assemblies and to the cable length measuring assembly, the data acquisition means collecting cable angular position data from the first and second cable angle measuring assemblies and cable length data from the cable length measuring assembly, whereby, when the probe is brought in contact with a point of a physical object, angle data and length data are respectively supplied to the data acquisition means by the first and second cable angle measuring assemblies and the cable length measuring assembly, the angle data and the length data permitting a determination of relative spacial coordinates of the point of the physical object with respect to the base member.

It is to be noted that the term "floor plan" as used herein is meant to include ceiling plans, roof plans, wall plans or the like in a two dimensional manner. The term "recorder" should herein be construed in its broad sense as encompassing a device which reads, indicates as well as registers data. Also, the term "extendable cable" should be construed as meaning that the cable may be extended in a measurable manner, but not stretched, and the term "electrically connected" should be construed as meaning that an electrical signal may be transferred from one point to another, for example, via an electrical wire, an optical fibre, a radio-frequency link, or the like.

Other objects, advantages and features of the present invention will become more apparent upon reading of the following non restrictive description of preferred embodiments thereof, given by way of example only with reference to the accompanying drawings.

BRIEF DESCRIPTION OF THE DRAWINGS

In the appended drawings:

FIG. 1A is a perspective view of a telemetric spacial data recorder according to an embodiment of the present invention;

FIG. 1B is a schematic block diagram of the electrical connections of the components of the telemetric spacial data recorder of FIG. 1;

FIG. 2 is a perspective view of the telemetric spacial data recorder of FIG. 1 of which the head covers have been removed;

FIG. 3 is a side elevational view of the telemetric spacial data recorder of FIG. 1 illustrating the pivoting and extension of the probe about a horizontal axis;

FIG. 6 is a top plan view of a probe tip used to contact concave or flat edges;

FIG. 8 is a side elevational view of the cable length measuring assembly of the telemetric spacial data recorder of FIG. 1;

FIG. 9 is a top plan view of the cable winding assembly of the telemetric spacial data recorder of FIG. 1;

FIGS. 10 to 15 are top plan views of a sequence of operations illustrating a simulation of data recording using the telemetric spacial data recorder of FIG. 1; and FIGS. 16 to 21 are top plan views of a sequence of operations illustrating a simulation of data recording using the telemetric spacial data recorder of FIG. 1.

DESCRIPTION OF THE PREFERRED EMBODIMENT

Figure 7:
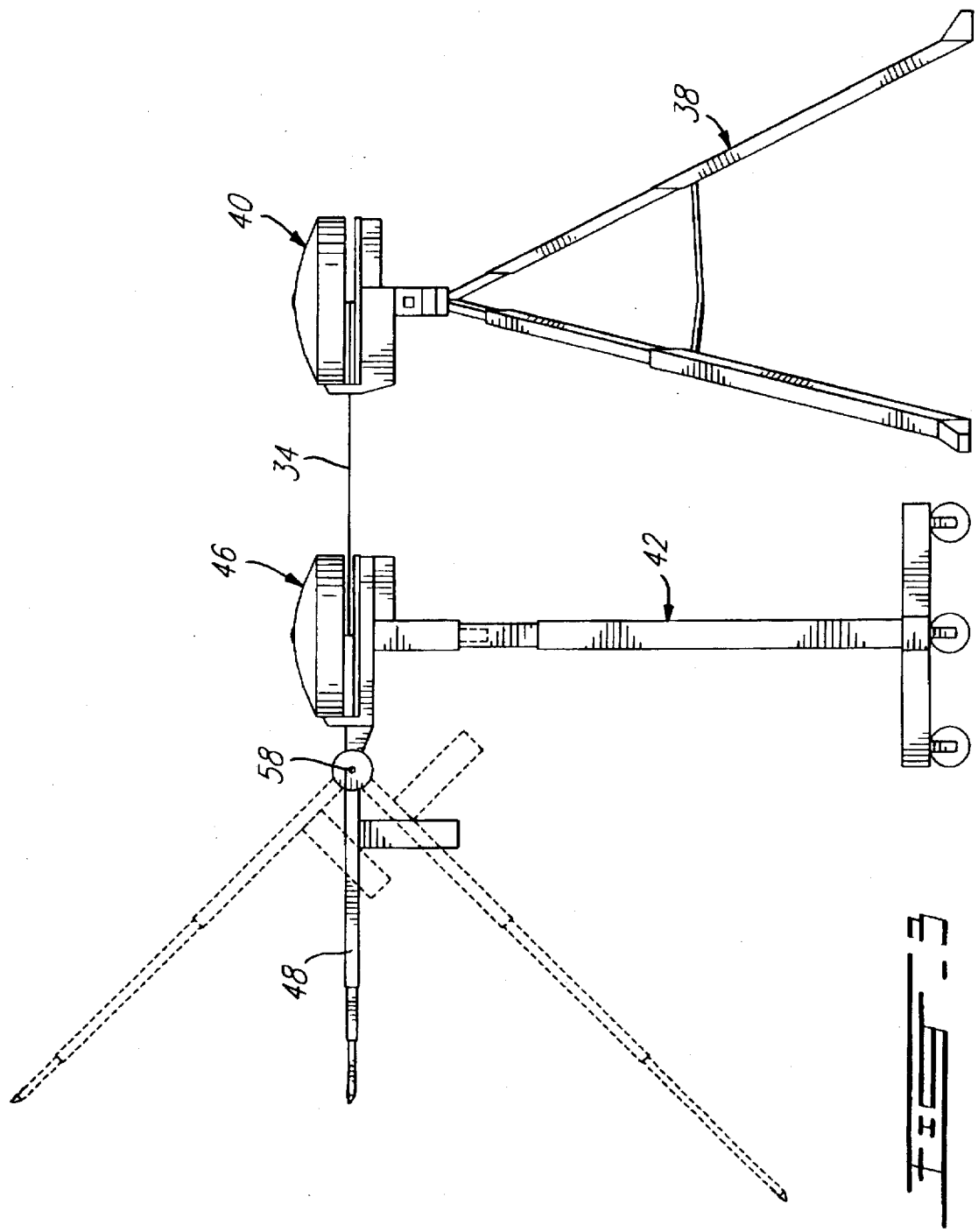
FIG. 7 is a top plan view of a probe tip used to contact convex edges.

FIG. 1A of the appended drawings illustrates a perspective view of a telemetric spacial data recorder 28 according to an embodiment of the present invention including a base member 30, a remote member 32, an extendable cable 34 and a data collecting device 36.

The base member 30 includes a support 38 and a head portion 40 mounted on support 38 and having a head cover 41.

The remote member 32 includes a movable support 42 having wheels 44, and a head portion 46, removably mounted on support 42, and having a head cover 47 and a probe 48.

As can be better seen from FIG. 1B, the data acquisition device 36 has a display screen 50, an electronic circuit 51, input devices under the forms of a pen 52 and keys 54 (see FIG. 1A), and is electrically connected to the remote member 32 and to the base member 30 via data connections 56 and 57, respectively. As illustrated in FIG. 1A, the data connection 56 may be under the form of a data cable. The data connection 57 between the base member 30 and the data acquisition device 36 is advantageously wireless, for example, the data connection 57 may be a RF data connection.

FIG. 2 is a perspective view of the telemetric spacial data recorder 28, wherein the head covers 41 and 47 have been removed to show the elements forming the head portions 40 and 46. In this figure, head portion 46 is also illustrated apart from the movable support 42.

FIG. 3 is a side elevational view of the telemetric spacial data recorder 28 showing the pivoting of the probe 48 about a horizontal pivoting axis 58. It is to be noted that the probe 48 includes sensors (not shown) to determine the angle defined by the probe 48 about axis 58 and to supply this data to the data acquisition device 36 via electrical connection 56 (see FIG. 1A).

This figure also illustrates (in dashed lines) the telescopic nature of the probe 48. Indeed, the probe 48 may be extended and retracted by the user when necessary. It is to be noted that the probe 48 includes sensors (not shown) to determine the length of the probe 48 and to supply this data to the data acquisition device 36 via electrical connection 56 (see FIG. 1A).

Figure 4:
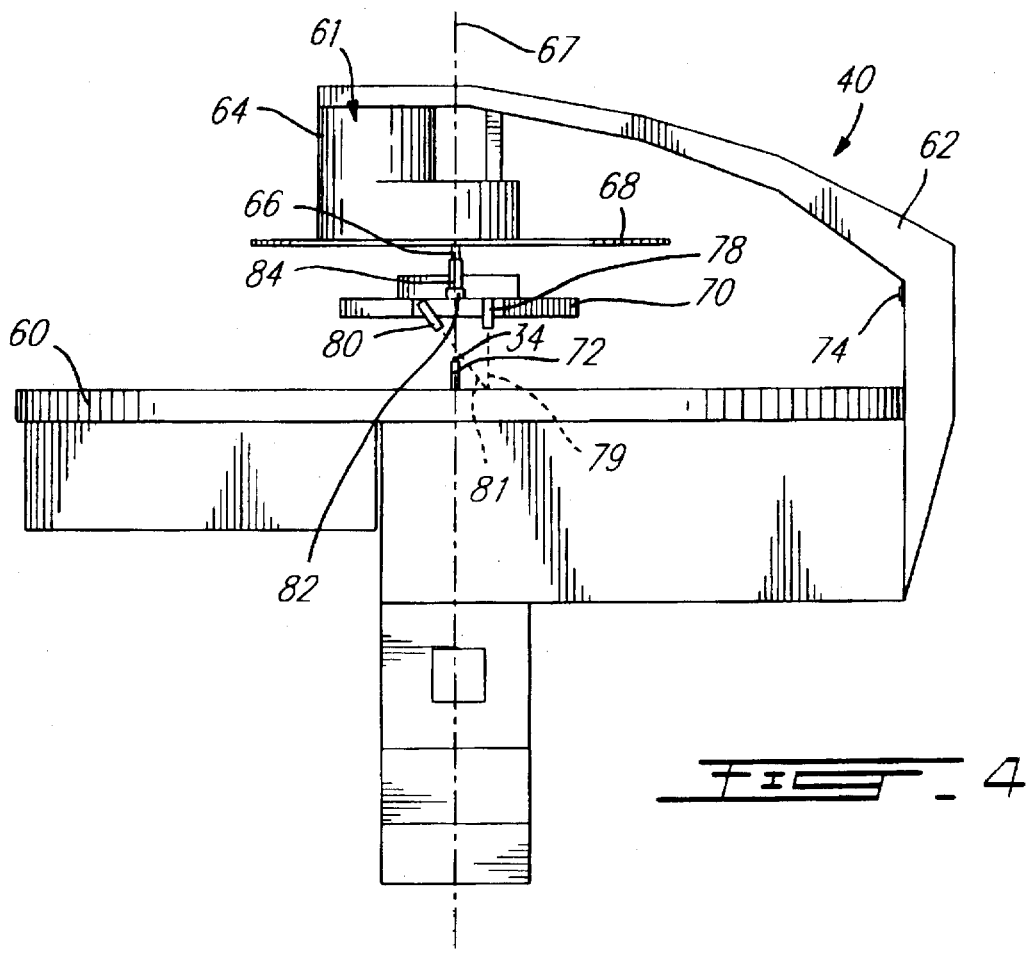
FIG. 4 is a side elevational view of a portion of a base member without the housing cover to show the angle measuring mechanism.
Figure 5:
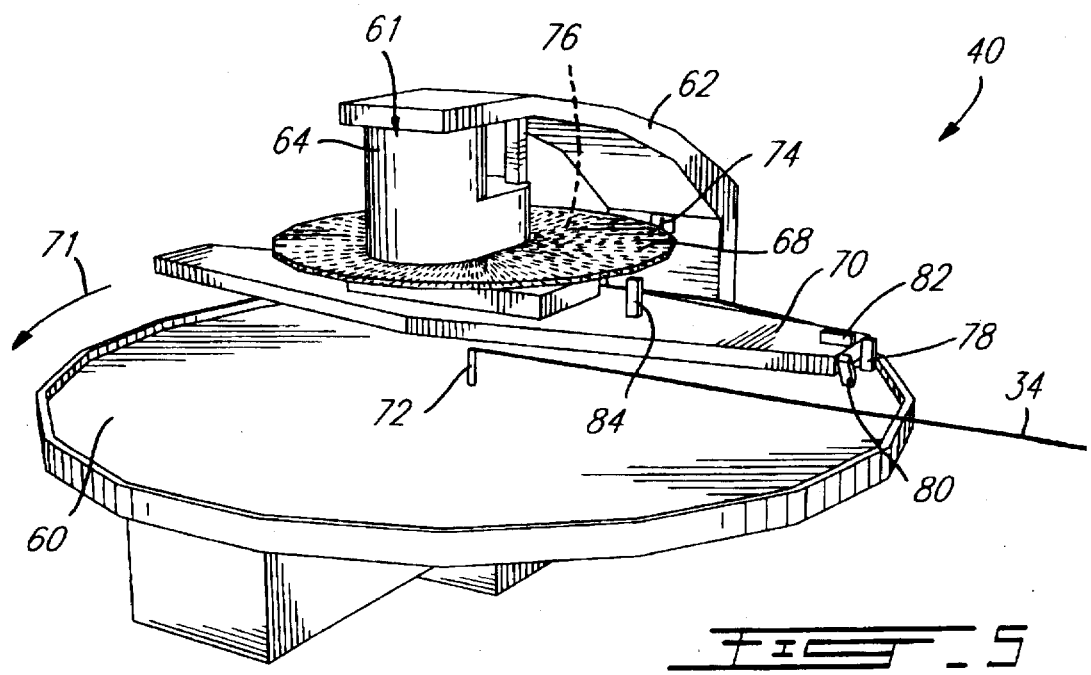
FIG. 5 is a perspective view of a portion of a base member without the head cover to show the angle measuring mechanism.

Turning now to FIGS. 4 and 5, the various elements forming the head portion 40 will be described.

Head portion 40 includes a flat table 60 and a cable angle measuring assembly 61 having a curved arm 62, an electric motor 64 having a rotative shaft 66 rotating about a rotation axis 67, a circular disk 68 and a rotatable support 70 mounted to the shaft 66.

The flat table 60 includes a centrally mounted hollow tubular member 72 through which the extendable cable 34 is inserted.

The curved arm 62 includes a reference point 74 facing in the direction of the rotatable support 70.

The electric motor 64 rotates the rotatable support 70 about axis 67 in a direction illustrated by arrow 71 (FIG. 5) to determine the angular position of the cable 34 as will be described hereinafter.

The circular disk 68 includes a plurality of radially disposed marks 76 facing the rotatable support 70 (see dashed lines in FIG. 5) the purpose of which will be described hereinafter. It is to be noted that the number of radial marks 76 illustrated in FIG. 5 is for illustration purposes only and that a greater number of radial marks 76 would advantageously be provided on an actual circular disk 68 so as to increase the precision of the angular measurement.

The rotatable support 70 includes first and second cable detecting sensors 78 and 80, a reference point sensor 82 and a radial marks sensor 84.

The cable detecting sensors 78 and 80, the reference point sensor 82 and the radial marks sensor 84 may advantageously be proximity detectors or other types of suitable sensing devices such as, for example, the combination of a beam generator such as a light source and a beam detecting means such as a photodetector.

As can be better seen from FIG. 4, cable sensor 78 is so mounted to the support 70 as to be perpendicular to the surface of the flat table 60 and emits a beam 79 in a direction perpendicular to the flat table 60. Therefore, the cable sensor 78 detects the cable 34 when the rotation of the rotative support 70 causes the cable 34 to intersect the beam 79. The sensor 78 then sends an electric signal to the data acquisition device 36 via electrical connection 57 (see FIG. 1B).

Cable sensor 80 is so mounted to the support 70 as to define a predetermined angle with the flat table 60 and emits a beam 82 defining a predetermined angle with the flat table 60. Therefore, the sensor 80 detects the cable 34 when the rotation of the rotative support 70 causes the cable 34 to intersect the beam 81. The sensor 80 then sends an electric signal to the data acquisition device 36 via electrical connection 57 (see FIG. 1B).

Reference point sensor 82 is so mounted to the support 70 as to face the reference point 74 when the rotative support 70 brings the reference point sensor 82 in alignment with the reference point 74. The reference point sensor 82 sends an electric signal to the data acquisition device 36 via electrical connection 57 (see FIG. 1B) when it passes in front of the reference point 74.

Radial mark sensor 84 is so mounted to the support 70 as to face the surface of the circular disk 68 having radial marks 76. The radial mark sensor 84 sends an electric signal to the data acquisition device 36 via electrical connection 57 (see FIG. 1B) each time it passes in front of a radial mark 76.

The operation of the rotatable support 70 to measure the angular position of the cable 34 will now be described. It is to be noted that the electric motor 64 is energized when the measurement of the angular position of the extendable cable 34 is performed.

As previously stated, sensors 78, 80, 82 and 84 are electrically connected to the data acquisition device 36 via electrical connection 57. As will be easily understood by one skilled in the art, the electronic circuit 51 of the data acquisition device 36 has inputs to which the sensors 78, 80, 82 and 84, and the input devices 52 and 54 are connected. The electronic circuit 51 has outputs connected to the display screen 50 to display the floor plan devised by the telemetric spacial data recorder 28.

The electronic circuit 51 is so configured as to determine the angular position of the cable 34, with respect to the reference point 74, in a plane perpendicular to the rotation axis 67, and to determine angular position of the cable 34, with respect to the horizontal, in a plane defined by the rotation axis 67 and the cable 34 itself.

To determine the angular position of the cable 34, with respect to the reference point 74, in a plane perpendicular to the rotation axis 67, the electronic circuit 51 uses the electric signals supplied by the cable sensor 78, the reference point sensor 82 and the radial mark sensor 84.

The electronic circuit 51 first receives an electric signal from the reference point sensor 82 when it passes in front of the reference point 74. Then, the electronic circuit 51 counts the number of electric signals it receives from the radial mark sensor 84 before it receives an electric signal from the cable sensor 78. The number of electric signals received from the radial mark sensor 84 is representative of the angular position of the cable 34 with respect to the reference point 74 since it is the number of radial marks 76 between the reference point 74 and the position of the cable 34.

As will be easily understood by one of ordinary skills in the art, since the electronic circuit 51 "knows" the number of radial marks 76 on the undersurface of the circular disk 68, the electronic circuit 51 may determine the angular position in degrees (°) of the cable 34 from the number of electric signals received from the radial marks sensor 84. As a non limiting example, if 360 radial marks 76 are present on the disk 68, each radial mark corresponds to one degree.

To determine the angular position of the cable 34, with respect to the horizontal, in a plane defined by the rotation axis 67 and the cable 34 itself, the electronic circuit 51 uses the electric signals supplied by the cable sensor 78, the cable sensor 80 and the radial mark sensor 84.

When the electronic circuit 51 receives an electric signal from the cable sensor 78 it starts to count the number of electric signals it receives from the radial mark sensor 84 until it receives an electric signal from the cable sensor 80. The number of electric signals received from the radial mark sensor 84 is representative of the angular position of the cable 34 with respect to the horizontal. Since cable sensor 80 forms an angle with the table 60 and cable sensor 78 is perpendicular to the table 60, the number of radial marks 76 separating the electric signal signals supplied by the sensors 78 and 80 is representative of the angular position of the cable 34 in a plane formed by the rotation axis 67 and the cable 34 itself. Indeed, as the upward angle defined by the cable 34 and the horizontal increases, the number of radial marks 76 counted by the electronic circuit 51 between the electric signals by the sensors 78 and 80 increases.

Again, since the electronic circuit 51 "knows" the number of radial marks 76 on the undersurface of the circular disk 68, the electronic circuit 51 may determine the angular position in degrees (°) of the cable 34 from the number of electric signals received from the radial marks sensor 84. For example, a look-up table could be calculated to determine the angular position in degrees for every number of radial marks 76 between the electric signals supplied by sensors 80 and 78.

It is to be noted that, apart from the probe 48, head portion 46 is similar to head portion 40 and will not be described separately.

However, as will be understood by one of ordinary skills in the art, the second cable sensor 80 of the head portion 46 of the remote member 32 could be replaced by a spirit level or by a circular spirit level (not shown), mounted to the head portion 46 to indicate the position of the remote member 32 with respect to a horizontal plane. This way, the user may level the remote member 32 before using it to determine the spacial coordinates of a point as will be discussed hereinafter.

FIGS. 8 illustrates a cable length measuring assembly 86 including a pair of friction wheels 88 and 90, while FIG. 9 illustrates a cable winding assembly 92 including a spool 94, an electric motor 96 and a friction clutch mechanism 98.

It is to be noted that both the cable length measuring assembly 86 and the cable winding assembly 92 may be mounted to either the base member 30 or the remote member 32. In the present embodiment, these assemblies 86 and 92 are mounted to the base member 30 under the flat table 60.

The extendable cable 34 is wound onto the spool 94 and is frictionally inserted between the friction wheels 88 and 90. One of the friction wheels 88 and 90 is rotatably mounted to a rotation counter (not shown) which supplies an electric signal, representative of the length of the cable 34 unwounded from the spool 94, to the data acquisition device 36 via electrical connection 57 (see FIG. 1B).

The spool 94 is mechanically connected to a rotative shaft 100 of the electric motor 96 through the clutch 98. The rotational direction of the shaft 100 is such that the cable 34 is wound onto the spool 94. However, the clutch 98 is so mounted that, when a user manually pulls on the cable 34, only a normal and moderate force is necessary to disengage the clutch 98, allowing the user to unwound the required length of cable 34. It is therefore possible to manually unwind a desired length of cable 34 while the slack of the cable 34 is automatically re-wound on the spool 94 to therefore keep cable 34 under a substantially constant tension.

FIGS. 8 and 9 are schematic representations of a cable length measuring assembly and a cable winding assembly. However, since these types of assemblies are well known in the art, they will not be described in more details. Furthermore, as will be apparent to one of ordinary skills in the art, the cable length measuring assembly and the cable winding assembly could be replaced by other mechanical and/or optical means to determine the length of unwound portion of the cable 34 and to automatically or manually wind the cable 34 onto the spool 94 when a slack exist in the cable 34, respectively.

FIGS. 6 and 7 illustrate the end of the probe 48 having a pointed tip 102 and a longitudinally slidable arrow shaped adaptor. As illustrated in FIG. 6, the pointed tip 102 is used to contact concave surfaces such as 106 or flat surfaces (not shown). As illustrated in FIG. 7, the arrow shaped adaptor 104 is used to contact convex surfaces such as 108.

As will be understood by one of ordinary skills in the art, the relative spacial coordinates of the point of the probe 48, with respect to the base member 30 may be determine with the help of (a) the length of the cable 34, (b) the angular position of the cable 34 with respect to a reference point 74 of the head portion 40, (c) the angular position of the cable 34 with respect to the horizontal in a plane defined by the rotation axis 67 of the head portion 40 and the cable 34 itself, (d) the angular position of the cable 34 with respect to a reference point 74 of the head portion 46, (e) the length of the probe 48 and (f) the angular position of the probe with respect to the horizontal axis 58, by using geometrical construction. This may easily be implemented in the electronic circuit 51.

First example of floor plan determination:

FIGS. 10–15 are schematic top plan views illustrating an example of the use of the telemetric spacial data recorder 28 illustrated in FIGS. 1–9 to devise the plan of a floor 100 having a plurality of walls 102–112 and a column 114 having a circular cross-section. For each figure, the devised plan is illustrated on the display screen 50.

To devise the plan of the floor 100, the base member 30 is first placed at an arbitraryposition on the floor 100.

The probe 48 is brought in contact with the beginning of the wall 102 and a first key 54 of the data acquisition device 36 is actuated to start the data acquisition of the spacial coordinates of the point of the probe 48. When the calculations are over, a dot 116 is displayed on the screen 50 to illustrate the spacial coordinated of the beginning of the wall 102.

The probe is then brought at the junction of the wall 102 and the column 114 (see FIG. 11). The user actuates a second key 54 to indicate to the data acquisition device 36 that a straight line will be entered and then actuates the first key 54 to start the data acquisition of the spacial coordinates of the point of the probe 48. When the calculations are over, a dot 118 and a straight line 120 joining the dot 116 to the dot 120 are displayed on the screen 50. Of course, the dot 118 corresponds to the location of the point of the probe 48 when the first key was actuated.

The probe is then brought at an arbitrary position on the column 114 (see FIG. 12). The user actuates a third key 54 to indicate to the data acquisition device 36 that an arc of circle will be entered and then actuates the first key 54 to start the data acquisition of the spacial coordinates of the point of the probe 48. When the calculations are over, a dot 122 corresponding to the location of the point of the probe 48 when the first key was actuated is displayed on the screen 50.

The data acquisition device 36 requires a third set of spacial coordinates to determine the radius of the circular cross-section of the column 114.

The probe is then brought at the junction between the column 114 and the wall 104 (see FIG. 13). The user actuates the first key 54 to start the data acquisition of the spacial coordinates of the point of the probe 48. When the calculations are over, a dot 124 corresponding to the location of the point of the probe 48 when the first key was actuated and a semi-circular line 126 joining dots 118, 122 and 124 are displayed on the screen 50.

The data acquisition may be continued from this point by indicating that straight lines are to be drawn between the dots as illustrated in FIGS. 14 and 15.

It is to be noted that since the angular position of the cable 34 at the remote member 32 may be varied and is measured, it has been possible to devise the plan of a floor 100 having a partially closed floor portion formed by the column 114 and the walls 104–112 without having moved the base member 30.

Second example of floor plan determination:

FIGS. 16–21 are schematic top plan views illustrating an example of the use of the telemetric spacial data recorder 28 illustrated in FIGS. 1–9 to devise the plan of a floor 200 having two rooms 202 and 204 separated by a door 206. For each figure, the devised plan is illustrated on the display screen 50.

FIGS. 16 and 17 illustrate the end of the devising of the room 202. These operations are similar to the operations described with respect to FIGS. 10–15.

The user then selects two dots on the screen 50 that are accessible from both rooms 202 and 204, for example dots 208 and 210 (see FIG. 18). The base member 30 may then be moved from room 202 to room 204 (see FIG. 19), and the spacial coordinates of the selected dots 208 and 210 are measured from the new location of the base member 30(see FIGS. 19 and 20). As will be apparent to one skilled in the art, the data acquisition device 36 may determine the relative spacial coordinates of the base member 30 with these measurements.

After these measurements are taken and that the data acquisition device 36 has determined the relative spacial coordinates of the base member 30, the user may continue to devise room 204 as previously described (see FIG. 21).

As will be understood by one of ordinary skills in the art of computers, the pen 52 and keys 54 could be replace by other types of input devices to operate the data acquisition device 36.

It is to be noted that the head portions 40 and 46 could be pivoted of an angle of 90°, for example, to allow the measurements of a wall.

It is also to be noted that the cable 34 is considered to be unstretchable; however, if it is not the case, the electronic circuit 51 of the data acquisition device 36 could be configured to compensate for the stretching of the cable 34.

Although the present invention has been described hereinabove by way of preferred embodiments thereof, it can be modified, without departing from the spirit and nature of the subject invention as defined in the appended claims.

What is claimed is:

1. A telemetric spacial data recorder for devising a floor plan comprising:
   a base member;
   a remote member having a probe;
   extendable cable means connecting said remote member to said base member, said extendable cable means being mounted to said base member so as to rotate about a rotation axis substantially perpendicular to the floor; said extendable cable having a variable length;
   a cable angle measuring assembly mounted to said base member to measure an angular position of said extendable cable means with respect to a predetermined reference point;
   a cable length measuring assembly mounted to one of said base member and said remote member for measuring the length of said extendable cable means; and
   data acquisition means electrically connected to said cable angle measuring assembly and to said cable length measuring assembly, said data acquisition means collecting cable angular position data from said cable angle measuring assembly and cable length data from said cable length measuring assembly,
   whereby, when said probe is brought in contact with a point of a physical object, angle data and length data are respectively supplied to the data acquisition means by said cable angle measuring assembly and by said cable length measuring assembly, said angle data and said length data permitting a determination of relative spacial coordinates of said point of said physical object with respect to said base member.

2. A telemetric spacial data recorder as defined in claim 1, wherein said data acquisition means include computing means being so configured as to determine relative spacial coordinates of points being contacted by said probe with respect to said base member by using said collected angle data and length data supplied to said data acquisition means by said cable angle measuring assembly and by said cable length measuring assembly, respectively.

3. A telemetric spacial data recorder as defined in claim 2, wherein said data acquisition means include display means electrically connected to said computing means for displaying said relative spacial coordinates of points being contacted by said probe.

4. A telemetric spacial data recorder as defined in claim 2, wherein said cable angle measuring assembly includes:
   rotative support means mounted to said base member for rotation about said rotation axis,
   first cable detection means mounted to said rotative support means and emitting a beam; said first cable detection means being so mounted as to emit said beam in a direction parallel to said rotation axis; said first cable detection means emitting a first electric signal when said beam intersects said extendable cable means; said first electric signal being supplied to said computing means to thereby allow the computing means to determine an angular position of said cable means in a plane perpendicular to said rotation axis, with respect to said predetermined reference point.

5. A telemetric spacial data recorder as defined in claim 4, wherein said cable angle measuring assembly includes a second cable detection means mounted to said rotative support means and emitting a beam; said second cable detection means being so mounted as to emit said beam at an angle with respect to said rotation axis; said second cable detection means emitting a second electric signal when said beam intersects said extendable cable means; said second electric signal being supplied to said computing means to thereby allow the computing means to determine an angular position of said cable means in a plane defined by said rotation axis and said extendable cable means.

6. A telemetric spacial data recorder as defined in claim 5, wherein said cable angle measuring assembly includes rotative support position determination means for determining the angular position of the rotative support means.

7. A telemetric spacial data recorder as defined in claim 6, wherein said rotative support position determination means includes (a) a disk having a plurality of radial markings and being mounted to said base member, said disk being mounted coaxially with said rotation axis, and (b) a radial marking reader mounted to said rotative support means so as to face said radial markings of said disk; said radial marking reader being electrically connected to said computing means for supplying an electrical signal to said computing means when said radial marking reader faces one radial marking of said disk.

8. A telemetric spacial data recorder as defined in claim 7, wherein said cable angle measuring assembly includes reference detecting means to detect said predetermined reference point; said reference detecting means being mounted to said rotative support means and being electrically connected to said computing means for supplying an electrical signal to said computing means when said reference detecting means faces said reference point.

9. A telemetric spacial data recorder as defined in claim 1, wherein said extendable cable means is wound upon a rotatable spool, said cable length measuring assembly includes means for measuring the portion of said extendable cable which is unwound from said rotatable spool.

10. A telemetric spacial data recorder as defined in claim 9, wherein said means for measuring includes a friction wheel having a predetermined outer circumference and being fixedly mounted to a rotation counter.

11. A telemetric spacial data recorder as defined in claim 10, wherein said rotatable spool includes a rotating mechanism to automatically wind the extendable cable upon said spool.

12. A telemetric spacial data recorder for devising a floor plan comprising:
   a base member;
   a remote member having a probe;
   extendable cable means connecting said remote member to said base member, said extendable cable means being so mounted to said base member as to rotate about a first rotation axis substantially perpendicular to the floor; said extendable cable means being so mounted to said remote member as to rotate about a second rotation axis substantially perpendicular to the floor; said extendable cable having a variable length;
   a first cable angle measuring assembly mounted to said base member to measure a first angular position of said extendable cable means with respect to a first predetermined reference point;
   a second cable angle measuring assembly mounted to said remote member to measure a second angular position of said extendable cable means with respect to a second predetermined reference point;
   a cable length measuring assembly mounted to one of said base member and said remote member for measuring the length of said extendable cable means; and
   data acquisition means electrically connected to said first and second cable angle measuring assemblies and to said cable length measuring assembly, said data acquisition means collecting cable angular position data from said first and second cable angle measuring assemblies and cable length data from said cable length measuring assembly, whereby when said probe is brought in contact with a point of a physical object, angle data and length data are respectively supplied to said data acquisition means by said first and second cable angle measuring assemblies and by said cable length measuring assembly, said angle data and said length data permitting a determination of relative spacial coordinates of said point of said physical object with respect to said base member.

13. A telemetric spacial data recorder as defined in claim 12, wherein said probe has a variable length and further including a probe length measuring assembly mounted to said remote member and electrically connected to said data acquisition means to supply probe length data to said data acquisition means.

14. A telemetric spacial data recorder as defined in claim 13, wherein said data acquisition means include computing means being so configured as to determine relative spacial coordinates of points being contacted by said probe with respect to said base member by using said collected angle data and length data supplied to said data acquisition means by said first and second cable angle measuring assemblies, said cable length measuring assembly, and said probe length measuring assembly.

15. A telemetric spacial data recorder as defined in claim 14, wherein said data acquisition means include display means electrically connected to said computing means for displaying said relative spacial coordinates of points being contacted by said probe.

16. A telemetric spacial data recorder as defined in claim 14, wherein said first cable angle measuring assembly includes:
rotative support means mounted to said base member for rotation about said first rotation axis,
first cable detection means mounted to said rotative support means and emitting a beam; said first cable detection means being so mounted as to emit said beam in a direction parallel to said first rotation axis; said first cable detection means emitting a first electric signal when said beam intersects said extendable cable means; said first electric signal being supplied to said computing means to thereby allow the computing means to determine an angular position of said cable means in a plane perpendicular to said first rotation axis, with respect to said first predetermined reference point.

17. A telemetric spacial data recorder as defined in claim 16, wherein said first cable angle measuring assembly includes a second cable detection means mounted to said rotative support means and emitting a beam; said second cable detection means being so mounted as to emit said beam at an angle with respect to said first rotation axis; said second cable detection means emitting a second electric signal when said beam intersects said extendable cable means; said second electric signal being supplied to said computing means to thereby allow the computing means to determine an angular position of said cable means in a plane defined by said first rotation axis and said extendable cable means.

18. A telemetric spacial data recorder as defined in claim 17, wherein said first cable angle measuring assembly includes rotative support position determination means for determining the angular position of the rotative support means.

19. A telemetric spacial data recorder as defined in claim 18, wherein said rotative support position determination means includes (a) a disk having a plurality of radial markings and being mounted to said base member, said disk being mounted coaxially with said first rotation axis, and (b) a radial marking reader mounted to said rotative support means so as to face said radial markings of said disk; said radial marking reader being electrically connected to said computing means for supplying an electrical signal to said computing means when said radial marking reader faces one radial marking of said disk.

20. A telemetric spacial data recorder as defined in claim 19, wherein said first cable angle measuring assembly includes reference detecting means to detect said first predetermined reference point; said reference detecting means being mounted to said rotative support means and being electrically connected to said computing means for supplying an electrical signal to said computing means when said reference detecting means faces said first reference point.

21. A telemetric spacial data recorder as defined in claim 20, wherein said second cable angle measuring assembly mounted to said remote member includes:
rotative support means mounted to said remote member for rotation about said second rotation axis,
first cable detection means mounted to said rotative support means and emitting a beam; said first cable detection means being so mounted as to emit said beam in a direction parallel to said second rotation axis; said first cable detection means emitting a first electric signal when said beam intersects said extendable cable means; said first electric signal being supplied to said computing means to thereby allow the computing means to determine an angular position of said cable means in a plane perpendicular to said second rotation axis, with respect to said second predetermined reference point.

22. A telemetric spacial data recorder as defined in claim 21, wherein said second cable angle measuring assembly includes a second cable detection means mounted to said rotative support means and emitting a beam; said second cable detection means being so mounted as to emit said beam at an angle with respect to said second rotation axis; said second cable detection means emitting a second electric signal when said beam intersects said extendable cable means; said second electric signal being supplied to said computing means to thereby allow the computing means to determine an angular position of said cable means in a plane defined by said second rotation axis and said extendable cable means.

23. A telemetric spacial data recorder as defined in claim 22, wherein said cable angle measuring assembly of said second cable angle measuring assembly includes rotative support position determination means for determining the angular position of the rotative support means.

24. A telemetric spacial data recorder as defined in claim 24, wherein said rotative support position determination means includes (a) a disk having a plurality of radial markings and being mounted to said remote member, said disk being mounted coaxially with said second rotation axis, and (b) a radial marking reader mounted to said rotative support means so as to face said radial markings of said disk; said radial marking reader being electrically connected to said computing means for supplying an electrical signal to said computing means when said radial marking reader faces one radial marking of said disk.

25. A telemetric spacial data recorder as defined in claim 24, wherein said second cable angle measuring assembly includes reference detecting means to detect said second predetermined reference point; said reference detecting means being mounted to said rotative support means and being electrically connected to said computing means for supplying an electrical signal to said computing means when said reference detecting means faces said second predetermined reference point.

26. A telemetric spacial data recorder as defined in claim 21, wherein said remote member also includes spirit level means.

27. A telemetric spacial data recorder as defined in claim 12, wherein said extendable cable means is wound upon a rotatable spool, said cable length measuring assembly includes means for measuring the portion of said extendable cable which is unwound from said rotatable spool.

28. A telemetric spacial data recorder as defined in claim 27, wherein said means for measuring includes a friction wheel having a predetermined outer circumference and being fixedly mounted to a rotation counter.

29. A telemetric spacial data recorder as defined in claim 28, wherein said rotatable spool includes a rotating mechanism to automatically wind the extendable cable upon said spool.

* * * * *